United States Patent [19]

Fujii

[11] 4,408,333
[45] Oct. 4, 1983

[54] DATA ACQUISITION CIRCUIT

[75] Inventor: Yasuhiko Fujii, Yamato, Japan

[73] Assignee: Victor Company of Japan, Limited, Yokohama, Japan

[21] Appl. No.: 338,995

[22] Filed: Jan. 12, 1982

[30] Foreign Application Priority Data

Jan. 13, 1981 [JP] Japan ............................... 56-3104[U]

[51] Int. Cl.³ .................... H03B 12/00; H04L 7/00
[52] U.S. Cl. ................................. 375/95; 375/111; 375/118; 328/63; 307/269
[58] Field of Search ............... 375/106, 118, 95, 113, 375/111, 110, 108; 328/63, 72–75, 109, 129; 307/239, 269, 272 A, 480, 518; 371/61

[56] References Cited

U.S. PATENT DOCUMENTS 3,471,790 10/1969 Kaps .............................. 307/269 X
3,820,030 6/1974 Williams ............................ 328/63
4,222,009 9/1980 Moulton et al. ................. 307/269 X Primary Examiner—Benedict V. Safourek
Assistant Examiner—Albert W. Watkins
Attorney, Agent, or Firm—Lowe, King, Price & Beeker

[57] ABSTRACT

A data acquisition circuit is adapted to receive information data, a synchronization pulse and a clock pulse which is transmitted at twice as high as the transmission rate of the information data. The clock and synchronization pulses are processed into a conditioning pulse for a divide-by-two frequency divider so that it conditions the divider to respond to the clock pulse by generating a data acquisition pulse at a frequency corresponding to the transmission rate of the information data in a correct phase relationship therewith.

3 Claims, 2 Drawing Figures

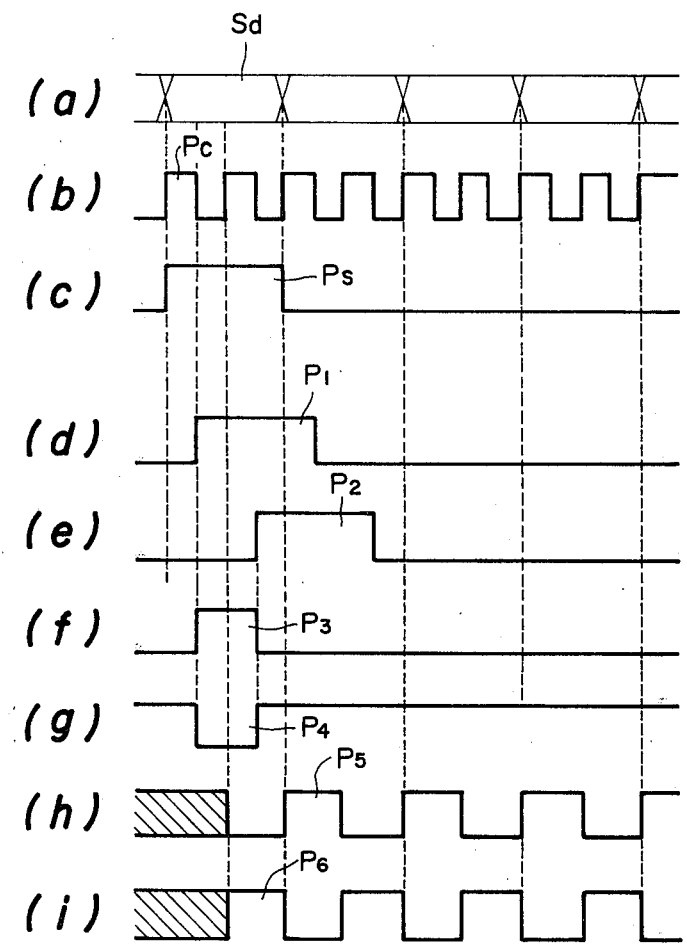

DATA ACQUISITION CIRCUIT

BACKGROUND OF THE INVENTION

The present invention relates to a data acquisition circuit.

In data processing systems which are interconnected by telecommunication channels, the data is transmitted at a rate lower than the system's normal transmission rate whenever such reduced transmission rate is justified by the use of low cost narrow band transmission channels and/or by the reduction of error rate.

Since the information data is conventionally transmitted with data synchronization and clock pulses in a predetermined phase relationship for data acquisition purposes at the receiving end of the system, the reduction of transmission rate is effected by reducing the transmission rate of the information data to one half of the system's nominal rate while transmitting the clock pulses at the nominal rate. At the receiving end, the clock pulses are frequency divided by a factor of two in a divide-by-two frequency divider to generate data acquisition pulses. However, the data acquisition pulse tends to occur at different timings depending on the operating states of the frequency divider at the time the clock pulse is applied thereto, so that data acquisition is not always correctly phased.

SUMMARY OF THE INVENTION

According to the invention, the data acquisition circuit comprises means responsive to a synchronization pulse and a clock pulse which is received at a rate twice as high as the transmission rate of information data, for generating a conditioning pulse of which the duration is twice as large as the duration of the clock pulse and the leading edge occurs at a time delayed by the duration of the clock pulse, and a divide-by-2 frequency divider responsive to the conditioning pulse and the clock pulse for generating a data acquisition pulse occurring at one half the rate of the clock pulse. Since the time of occurrence and duration of the conditioning pulse are determined by the received clock and synchronization pulses, the operating state of the frequency divider is predeterminable and therefore the data acquisition pulse occurs in a predetermined phase relationship with the information data.

Preferably, the conditioning pulse generating means comprises a first bistable device having a first input responsive to the synchronization pulse and a second input terminal responsive to the clock pulse and arranged to switch to the binary state of the first input terminal thereof in response to the trailing edge transition of the clock pulse. A second bistable device is provided having a first input terminal connected to the output of the first bistable device and a second input terminal responsive to the clock pulse and arranged to switch to the binary state of the first input terminal thereof in response to the trailing edge transition of the clock pulse, and coincidence gate means for combining the outputs of the first and second bistable devices to generate the conditioning pulse. In a further preferred embodiment, the divide-by-2 frequency divider comprises a bistable device arranged to respond to the leading edge transition of the clock pulse by switching its bistable condition to a first binary state in the presence of the conditioning pulse and arranged to reverse the bistable condition in response to the leading edge transition of the clock pulses which subsequently occur in the absence of the conditioning pulse.

BRIEF DESCRIPTION OF THE DRAWINGS

The invention will be described in further detail with reference to the accompanying drawings, in which:

FIGS. 2a and 2i are illustrations of waveforms which are useful for describing the operation of the FIG. 1 embodiment.

DETAILED DESCRIPTION

Figure 1:
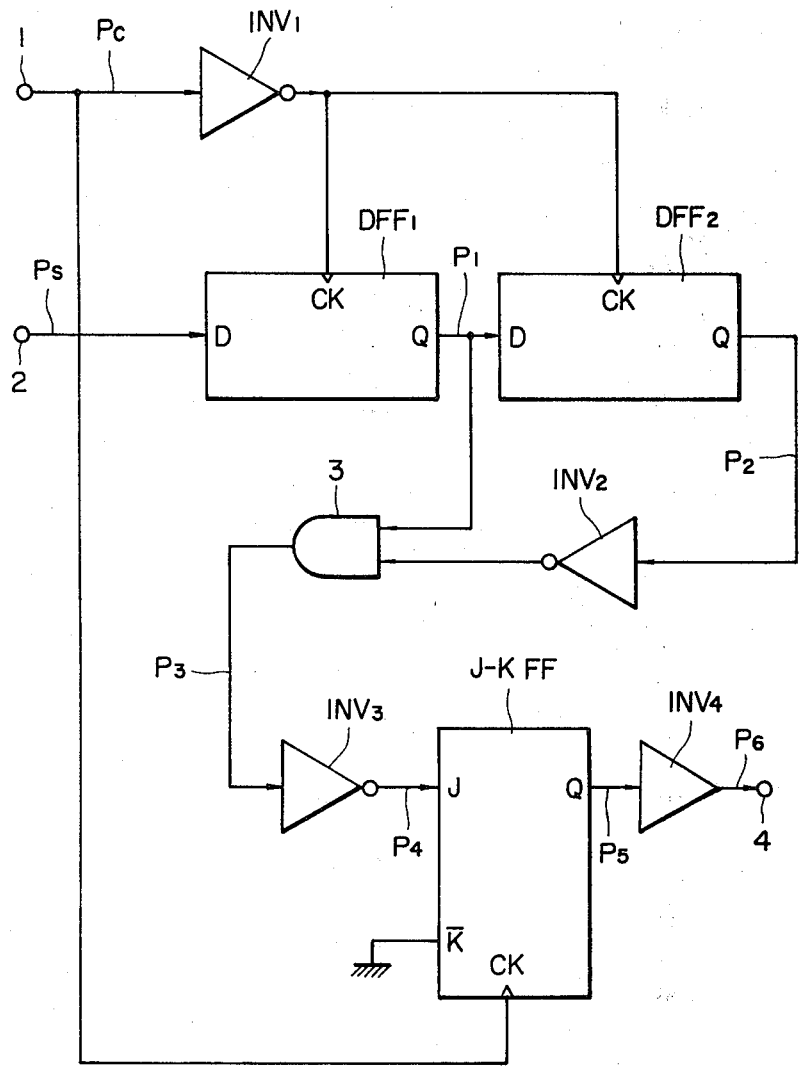
FIG. 1 is a block diagram of the data acquisition circuit of the invention.

Referring to FIG. 1, there is shown a preferred embodiment of a data acquisition circuit of the invention which is adapted to receive a clock pulse Pc at terminal 1, a data synchronization pulse Ps at terminal 2 as well as information data Sd. The information data is transmitted at one half the system's normal transmission rate while the clock pulse is transmitted at the nominal rate. The circuit comprises a first D-type flip-flop DFF1 having its clock input CK connected via an inverter INV1 to the terminal 1 to receive square wave clock pulses Pc (FIG. 2b). The data input D of the flip-flop DFF1 is connected to the terminal 2 to receive the synchronization pulse Ps (FIG. 2c). The Q output of the flip-flop DFF1 switches to the logical level of the data input terminal D in response to the trailing edge of the clock pulse Pc due to the inversion of clock pulse by inverter INV1, thereby generating a pulse P1 (FIG. 2d) having the duration of synchronization pulse Ps but delayed with respect to Ps by the duration of clock pulse Pc. The output of the first flip-flop DFF1 is coupled to the data input of a second D-type flip-flop DFF2 having its clock input CK connected to the output of the inverter INV1 to generate a pulse P2 (FIG. 2e) having the duration of synchronization pulse Ps but delayed with respect thereto by the pulse spacing of clock pulse Pc.

The pulses P1 and P2, of which the latter is inverted by inverter INV2, are coupled to an AND gate 3 to generate a positive-going conditioning pulse P3 (FIG. 2f) having the duration equal to the pulse spacing of clock pulse Pc but delayed with respect to Ps by the duration of clock pulse Pc. The conditioning pulse P3 is inverted by an inverter INV3 providing a negative-going pulse P4 (FIG. 2g) to the J input of a J-K flip-flop J-K FF of which the K̄ input is coupled to the ground. This flip-flop is conditioned by the pulse applied to its J input and operates as a frequency divider that divides the frequency of the clock pulses Pc by a factor of 2. The clock input CK of the J-K flip-flop is coupled to the clock input terminal 1. The Q output of the J-K flip-flop thus goes low in the presence of a low level input to the J terminal in response to the leading edge of a clock pulse Pc. In the presence of a high level input to the J terminal that prevails after the trailing edge of pulse P4 the J-K flip-flop reverses its Q output state in response to the leading edge transition of each succeeding clock pulse Pc, thus generating a train of pulses P5 (FIG. 2h) at the Q output of the J-K flip-flop. The pulses P5 are reversed in polarity by an inverter INV4 as shown at P6 in FIG. 2i and fed to an output terminal 4 to serve as data acquisition pulses.

It is seen that the leading edge transition of the data acquisition pulse P6 occurs exactly in phase with the midpoint of information data Sd, FIG. 2a. Therefore, data acquisition can be effected with a high degree of precision not attainable with prior art data acquisition circuits.

What is claimed is:

1. A data acquisition circuit adapted to receive information data, a synchronization pulse and a clock pulse, the clock pulse at a repetition rate twice as high as the transmission rate of said information data, said circuit comprising:

means responsive to said synchronization pulse and said clock pulse for generating a conditioning pulse of which the duration is twice as large as the duration of said clock pulse and the leading edge occurs at a time delayed from the synchronization pulse by the duration of said clock pulse; and a divide-by-two frequency divider responsive to said conditioning pulse and said clock pulse for generating a data acquisition pulse occurring at one half the rate of said clock pulse.

2. A data acquisition circuit as claimed in claim 1, wherein said conditioning pulse generating means comprises a first bistable device having a first input responsive to said synchronization pulse and a second input terminal responsive to said clock pulse and arranged to switch to the binary state of the first input terminal thereof in response to the trailing edge transition of said clock pulse, a second bistable device having a first input terminal connected to the output of said first bistable device and a second input terminal responsive to said clock pulse and arranged to switch to the binary state of the first input terminal thereof in response to the trailing edge transition of said clock pulse, and coincidence gate means for combining the outputs of said first and second bistable devices to generate said conditioning pulse.

3. A data acquisition circuit as claimed in claim 1 or 2, wherein said divide-by-two frequency divider comprises a bistable device arranged to response to the leading edge transition of said clock pulse by switching its bistable condition to a first binary state in the presence of said conditioning pulse and arranged to reverse said bistable condition in response to the leading edge transition of said clock pulses which occur in the absence of said conditioning pulse.

* * * * *